United States Patent
Wang et al.

(10) Patent No.: US 6,544,351 B2
(45) Date of Patent: Apr. 8, 2003

(54) COMPOSITIONS AND METHODS FOR PRODUCING COATINGS WITH IMPROVED SURFACE SMOOTHNESS AND ARTICLES HAVING SUCH COATINGS

(75) Inventors: Hongyu Wang, Niskayuna, NY (US); James Anthony Ruud, Delmar, NY (US); Larry Steven Rosenzweig, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,034

(22) Filed: Jul. 12, 2001

(65) Prior Publication Data

US 2003/0017355 A1 Jan. 23, 2003

(51) Int. Cl.$^7$ .............................. C23C 30/00; B22F 9/00
(52) U.S. Cl. ......................... 148/22; 428/546; 428/570; 428/539.5; 419/66
(58) Field of Search ................................. 428/546, 570, 428/539.5; 148/22, 514, 437; 419/66; 427/201, 372.2

(56) References Cited

U.S. PATENT DOCUMENTS

| | | | |
|---|---|---|---|
| 3,248,251 A | 4/1966 | Allen | |
| 3,869,293 A | 3/1975 | Brumbaugh | |
| 4,005,989 A | 2/1977 | Preston et al. | |
| 4,537,632 A | 8/1985 | Mosser | |
| 4,606,967 A | 8/1986 | Mosser | |
| 4,617,056 A | 10/1986 | Mosser et al. | |
| 4,659,613 A | 4/1987 | Mosser et al. | |
| 5,409,970 A | * | 4/1995 | Mosser et al. |
| 6,074,464 A | * | 6/2000 | Eddinger et al. |
| 6,150,033 A | * | 11/2000 | Mosser et al. |
| 6,190,471 B1 | 2/2001 | Darolia et al. | |
| 6,210,791 B1 | * | 4/2001 | Skoog et al. |
| 6,218,029 B1 | 4/2001 | Rickerby | |

* cited by examiner

Primary Examiner—John J. Zimmerman
Assistant Examiner—Jason Savage
(74) Attorney, Agent, or Firm—Toan P. Vo; Noreen C. Johnson

(57) ABSTRACT

A coating composition produces a protective coating to a substrate, which coating has an improved surface smoothness. The coating composition comprises a mixture of at least a first type of particles and a second type of particles that are dispersed in a liquid medium. The particles form a total population of particles having a median ESD in a range from about 1 to about 7 micrometers. The different types of particles have different median ESDs. The first type of particles has a maximum ESD of about 40 micrometers, and the second type of particles has a maximum ESD of about 20 micrometers. A method for producing a coating having an improved surface smoothness comprises applying such a coating composition on a substrate and curing the coating composition to produce a protective coating. The coating may be further densified by a burnishing process or further improved by applying another coating comprising particles having ESDs less than about 4 micrometers.

24 Claims, 2 Drawing Sheets

COMPOSITIONS AND METHODS FOR PRODUCING COATINGS WITH IMPROVED SURFACE SMOOTHNESS AND ARTICLES HAVING SUCH COATINGS

BACKGROUND OF INVENTION

The present invention relates to compositions and methods for producing coatings on components used in harsh environment and to such components. More particularly, the present invention relates to compositions and methods for producing improved surface smoothness of coatings on components of turbine engines and to such components.

Metallic components of machinery must often be used in many harsh environments, being exposed to very high temperatures and/or to abrasive or corrosive gases. In such applications, these metallic components are typically coated with one or more layers of protective materials to extend their service life. In many applications, such as gas turbine engines, efficiency further dictates that the surfaces of the components exposed to the hot gas be as smooth as possible to minimize pressure drop due to surface roughness which results in friction loss. Components of gas turbine engines, such as compressor blades and vanes, are commonly coated with a corrosion-resistant coating. Such a coating provides cathodic protection of the stainless steel components from corrosion-causing elements in the inlet gas stream. To form such a coating, aluminum-rich particles or particles of a mixture of aluminum and other metals are mixed into a slurry that is applied to the surface of a turbine engine component. The coating is cured to solidify and harden the slurry matrix to form a durable coating. The coating is mechanically burnished, typically with a glass bead blast, to form an electrically conductive coating from a continuous network of the aluminum particles. As gas must flow past these turbine engine components, the surface coating must be as smooth as possible so not to compromise the aerodynamic efficiency of the gas turbine engine. Moreover, for economic and operational reasons, the protective coating should also be as thin as practicable. These desires have been satisfied largely, for example, by using nearly spherical particles having a small equivalent spherical diameter ("ESD") and a narrow particle distribution. As used herein, the term "ESD" of a particle of irregular shape means the diameter of a sphere having the same volume as the particle. A "median ESD" or "$D_{50}$" is the ESD for which fifty percent (by volume) of the population of the particles has ESD below that value. However, very small aluminum particles are pyrophoric, presenting handling difficulty, and a narrow particle distribution most often increases manufacturing cost.

Therefore, it is desirable to provide particles for coating compositions, which particles do not have the shortcomings of the prior art particles and can produce a coating having reduced surface roughness. In addition, it is also very desirable to provide a method for producing a coating having reduced surface roughness that uses such coating compositions. It is also very desirable to provide machinery components that have a reduced surface roughness and have extended service life in harsh environments.

SUMMARY OF INVENTION

The present invention provides a coating composition that comprises a mixture of at least a first type of particles and a second type of particles, which particles are dispersed in a liquid medium. The particles of the total population have a median ESD in the range from about 1 to about 7 microns, and the two types of particles have different median ESDs. The first type of particles has a maximum ESD of about 40 micrometers and preferably has a median ESD greater than about 5 micrometers. The second type of particles has a maximum ESD of about 20 micrometers and preferably has a median ESD smaller than about 3 micrometers.

The present invention also provides a method for producing at least a first coating on a substrate, which coating has a reduced surface roughness. The method comprises the steps of: (1) preparing a coating composition that comprises a mixture of at least a first type of particles and a second type of particles, which particles are dispersed in at least a first liquid medium; the two types of particles having different median ESDs; (2) applying the coating composition on the substrate; and (3) curing to solidify the coating composition to produce a coating having a reduced surface roughness.

In another aspect of the present invention, the method further comprises the step of densifying the coating.

In another aspect of the present invention, the method further comprises the steps of applying a second coating on the first coating and curing the second coating. The second coating comprises a third type of particles having a maximum ESD less than about 4 micrometers, which particles are dispersed in a second liquid medium.

The present invention also provides articles having protective coatings formed from coating compositions or methods disclosed above.

Other features and advantages of the present invention will be apparent from a perusal of the following detailed description of the invention and the accompanying drawings.

DETAILED DESCRIPTION

Figure 1:
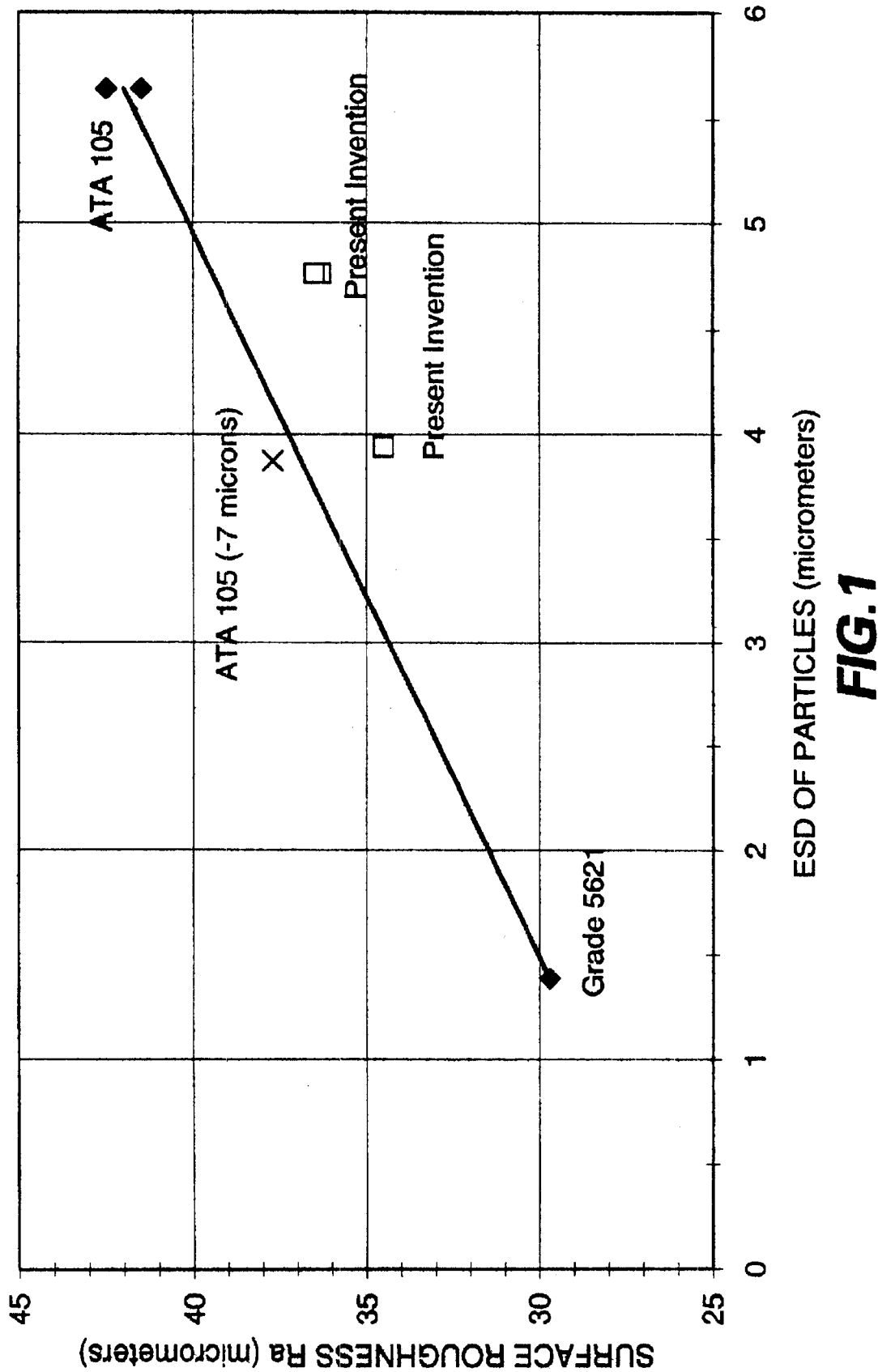
FIG. 1 shows the surface roughness of coatings with respect to ESD of particles.

As used herein, the term "surface roughness" or "$R_a$" is defined as follows:

$$R_a = (1/L)\int_0^L f(x)dx; \qquad \text{(Equation 1)}$$

wherein f(x) is the local roughness in micrometers of a surface measured perpendicularly thereto; L is a representative distance along the surface; and x is local position along this representative distance.

The present invention provides coating compositions that result in coatings having improved surface roughness compared to coating compositions of the prior art using particles having a wide particle distribution. In machinery that handles large flows of fluid, it is very desirable to provide components having surfaces as smooth as possible because rough surfaces increase friction loss and, thus, decrease energy efficiency of the machinery. Coating compositions of the present invention use particles that do not require tight control of particle size distribution and expensive manufacturing process, such as those of the prior art that require nearly spherical particles and narrow particle size distribution.

Coating compositions of the present invention comprises a mixture of at least a first type of particles and a second type of particles, which particles are dispersed in a liquid medium. The median ESD of the particles is in the range from about 1 to 7 micrometers, preferably from about 1 to about 6 micrometers, more preferably from about 2 to about 5 micrometers, and most preferably from about 4 to 5 micrometers. The first type of particles has ESD less than about 40 micrometers, preferably less than about 30 micrometers, and more preferably less than about 20 micrometers. The first type of particles has a median ESD greater than about 5 micrometers. The second type of particles has ESD smaller than about 20 micrometers, preferably smaller than about 15 micrometers, and more preferably smaller than about 10 micrometers. The second type of particles has a median ESD smaller than about 3 micrometers, preferably smaller than about 2 micrometers, and more preferably smaller than about 1.5 micrometer. embodiment of the present invention, the distribution of particle ESDs of the total population of the mixture exhibits a bimodal distribution having a first peak at an ESD greater than 5 micrometers and a second peak at an ESD less than 5 micrometers.

The particles of the first and the second type may comprise a single material or a mixture of different materials. One material that is very suitable to be used to form protective coatings on gas turbine engine components is aluminum. The particles may comprise a substantially pure material, such as aluminum, chromium, zirconium, cobalt, nickel, iron, titanium, yttrium, gadolinium, or other suitable metals; or an alloy of several of these materials. For example, the particles may comprise an alloy of aluminum and one or more metals selected from the group consisting of chromium, zirconium, cobalt, nickel, iron, titanium, yttrium, gadolinium, and other suitable metals. The particles may also comprise ceramic materials, such as oxides, carbides, borides, and nitrides of aluminum, chromium, zirconium, titanium, nickel, cobalt, magnesium, yttrium, gadolinium, or other suitable metals. The particles may comprise an inner core of one material and an outer layer of another material. The inner core materials of the two types of particles may be the same or different. Similarly, the outer layer materials of the two types of particles may be the same or different. The particle materials are chosen to provide the best protection of the machinery component in the specific environment to which it is exposed. It may also be desirable to select materials for the coating composition that would provide a coating having a thermal expansion that is closely matched with the material of the underlying structure. In the case in which the coating material acts to form a sacrificial oxide layer, aluminum particles are preferred.

The particles of the coating composition are dispersed and preferably kept in suspension in a liquid medium. The liquid medium may be an aqueous medium having amounts of additives that can enhance the performance of the coating or the ease of application of the coating composition on a substrate. For example, certain metals, such as chromium or hafnium, that desirably form an alloy with a material of the particles may be added into the aqueous medium as oxide ions. Certain phosphates, such as chromium phosphate, calcium phosphate, or aluminum phosphate, that desirably form a cementitious binder to contain the particles in a coating form may be added into the aqueous medium. Other additives, such as surfactants, may be added into the aqueous medium to reduce surface tension of the coating composition and to promote the formation of a better smoothness of the surface of the coating.

A coating composition of the present invention may be applied on a substrate, such a turbine engine component, by spraying, painting, or dipping. Spraying is the preferred method of application.

EXAMPLES

Coating compositions of the present invention were made with particles of two types of aluminum powder particles: ATA 105 and Grade 5621 aluminum powders available from Toyal America, Inc. The typical particle characteristics of these two types of particulate materials are shown in the following Table 1. All particle diameters were measured with laser light scattering technique.

TABLE 1

| Material | ATA 105 | Grade 5621 |
| --- | --- | --- |
| $D_{10}$ (micrometers) | 2.3 | 0.8 |
| $D_{50}$ (micrometers) | 6.0 | 1.4 |
| $D_{90}$ (micrometers) | 14.9 | 3.4 |
| $D_{max}$ (micrometers) | 52.3 | 16.6 |

$D_{10}$, $D_{50}$, $D_{90}$, $D_{max}$ are the values for which 10%, 50%, 90%, and 100% (by volume) of the particle population have ESD smaller than the specified value, respectively.

Coating compositions were made by mixing two samples of ATA 105 and Grade 5621 aluminum powders with various volume percentages of these two types of particles and dispersed in an aqueous solution containing chromate and phosphate ions. The coating compositions were applied by spraying on flat coupon panels made of stainless steel to a thickness of about 50 micrometers and cured in air at a temperature of about 260° C. for about 2 hours. Surface roughness was measured using a stylus profilometer and calculated according to Equation 1 above and shown in Table 2.

TABLE 2

| Coating Composition | $D_{50}$ (micrometers) | $D_{90}$ (micrometers) | $R_a$ (micrometers) |
| --- | --- | --- | --- |
| ATA 105 | 6.0 | 15.5 | 42.5 |
| ATA 105 | 6.0 | 15.5 | 41.5 |
| Grade 5621 | 1.4 | 3.4 | 29.7 |
| ATA 105 (80 vol. %) and 5621 (20 vol. %) | 4.8 | 14.4 | 36.3 |
| ATA 105 (80 vol. %) and 5621 (20 vol. %) | 4.8 | — | 36.5 |
| ATA 105 (70 vol. %) and 5621 (30 vol. %) | 3.9 | — | 34.5 |
| ATA 105 (−7 µm) | 3.9 | 8.2 | 37.7 |

The results of the surface roughness measurement are shown in FIG. 1. It is seen that by mixing at least two types of particles that have different $D_{50}$ values, the present invention provided coating having improved surface roughness, as exhibited by surface roughness that is below the line connecting the points representing the surface roughness resulting from using ATA 105 and Grade 5621 particles. The present invention also provides a better surface roughness than a coating made from simply sieving out the particles of ATA 105 that are greater than 7 micrometers although the last material had a median ESD of similar magnitude to the median ESD of a composition of the present invention. Although the Applicants do not wish to be bound by any particular theory, it is believed that a more densely packed coating results from a mixture of two types of particles having very different particle size distributions.

Figures 2A, 2B:
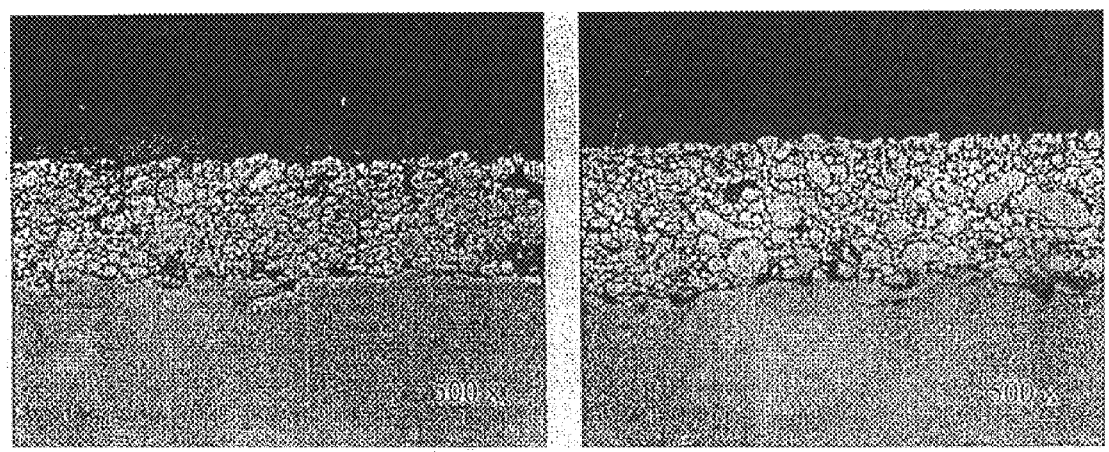
FIG. 2A is a micrograph showing the microstructure of a coating made with a prior art mixture of particles.
FIG. 2B is a micrograph showing the microstructure of a coating made with a coating composition of the present invention.

This effect is clearly seen in FIGS. 2A and 2B. The coating composition of the present invention provides a denser and smoother surface, as is seen in FIG. 2B.

The present invention also provides a method for producing a protective coating on a substrate, which coating has an improved surface roughness. The method comprises the steps of: (1) preparing a coating composition that comprises a mixture of at least a first type of particles and a second type of particles dispersed in a first liquid medium, the two types of particles having different median ESDs; (2) applying the coating composition on the substrate; and (3) curing the coating composition at a temperature for a time sufficient to solidify the coating composition to produce a coating having a reduced surface roughness. The median ESD of the total population of the particles is in the range from about 1 to about 7 micrometers, preferably from about 1 to about 6 micrometers, more preferably from about 2 to about 5 micrometers, and most preferably from about 4 to about 5 micrometers. The first type of particles has ESD smaller than about 40 micrometers, preferably smaller than about 30 micrometers, and more preferably smaller than about 20 micrometers. The first type of particles has a median ESD greater than about 5 micrometers. The second type of particles has ESD less than about 20 micrometers, preferably smaller than about 15 micrometers, and more preferably smaller than about 10 micrometers. The second type of particles has a median ESD smaller than about 3 micrometers, preferably smaller than about 2 micrometers, and more preferably smaller than about 1.5 micrometer.

Suitable materials for particles used in the present invention are disclosed above. The coating compositions of the present invention may be applied onto a substrate by spraying, painting, or dipping. Preferably, the coating composition is applied by a pressurized spray nozzle, for example at a pressure of less than about 800 kPa. A protective coating having a thickness of about 30–100 micrometers or more can be built up by such a spraying in one or more applications. The coating composition is cured by heating up to a temperature less than 1000° C. for a time sufficient to solidify the coating composition and result in a hard and dense coating. Preferably, this temperature is lower than the lowest melting point of the particles in the coating composition. For example, when aluminum particles are used, the curing temperature is in the range from about 250° C. to about 300° C. The step of curing may be carried out at a constant temperature of under a temperature ramp from ambient. In many circumstances, a temperature ramp may be preferred to prevent a thermal shock to a newly applied uncured coating. The curing step may be carried out under an atmosphere appropriate for the materials used.

The method for producing a coating of the present invention may further comprise the step of densifying the coating after the step of curing. This step also is referred to as the burnishing step, wherein the cured coating is impinged with glass beads (140–270 mesh, for examples), aluminum oxide (100 mesh, for example), zirconia (100 mesh, for example), or silicon carbide (100 mesh, for example) to mechanically cold work the coating surface and make the coating denser and more electrically conductive. The burnishing step typically improves the protective capacity of the coating.

In another aspect of the present invention, the method further comprises the steps of: drying the uncured coating after the step of applying the coating composition on the substrate; preparing a second coating composition comprising particles having ESD smaller than about 4 micrometers, preferably smaller than about 3 micrometers, dispersed in a second liquid medium; applying the second coating composition on the dried uncured coating of the first composition; and heating the coating compositions on the substrate at a temperature and for a time sufficient to cure the coatings. The material of the particles of the second coating may be selected from the materials disclosed above to be suitable for the specific application.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A coating composition comprising a mixture of at least a first type of particles and a second type of particles, said particles being dispersed in a liquid medium, said particles forming a total population of particles, said total population having a median equivalent spherical diameter ("median ESD") in a range from about 1 to about 7 micrometers, said types of particles having different median equivalent spherical diameters ("median ESDs"), said first type of particles having a maximum ESD of about 40 micrometers, said second type of particles having a maximum ESD of about 20 micrometers.

2. The coating composition according to claim 1, wherein said first type of particles has a median ESD greater than about 5 micrometers, and said second type of particles has a median ESD smaller than about 3 micrometers.

3. The coating composition according to claim 2, wherein said first type of particles represents from about 60% to about 90% by volume of said total population, said second type of particles represents from about 10% to about 40% by volume of said total population, and said total population has a median ESD from about 4 to about 5 micrometers.

4. The coating composition according to claim 2, wherein said median ESD of said second type of particles is smaller than about 2 micrometers.

5. The coating composition according to claim 2, wherein said median ESD of said second type of particles is smaller than about 1.5 micrometers.

6. The coating composition according to claim 1, wherein said median ESD of said particle population is in a range from about 1 to about 6 micrometers.

7. The coating composition according to claim 1, wherein said first type of particles has a maximum ESD of about 30 micrometers; and said second type of particles has a maximum ESD of about 10 micrometers.

8. The coating composition according to claim 1, wherein materials of said two types of particles are selected from the group consisting of aluminum, chromium, zirconium, cobalt, nickel, iron, titanium, yttrium, gadolinium, combinations thereof, and alloys thereof.

9. The coating composition according to claim 8, wherein materials of said two types of particles are the same.

10. The coating composition according to claim 8, wherein materials of said two types of particles are different.

11. The coating composition according to claim 1, wherein materials of said two types of particles are selected from the group consisting of oxides, carbides, borides, and nitrides of a metal selected from the group consisting of aluminum, chromium, zirconium, cobalt, nickel, iron, titanium, yttrium, gadolinium, and combinations thereof.

12. The coating composition according to claim 11, wherein materials of said two types of particles are the same.

13. The coating composition according to claim 11, wherein materials of said two types of particles are different.

14. The coating composition according to claim 1, wherein each particle of said types of particles comprises an inner core of a first material and an outer layer of a second material.

15. The coating composition according to claim 14, wherein said inner core of said first type of particles comprises the same material as said inner core of said second type of particles.

16. The coating composition according to claim 14, wherein said inner core of said first type of particles comprises a different material from said inner core of said second type of particles.

17. The coating composition according to claim 14, wherein said outer layer of said first type of particles comprises the same material as said outer layer of said second type of particles.

18. The coating composition according to claim 14, wherein said outer layer of said first type of particles comprises a different material from said outer layer of said second type of particles.

19. The coating composition according to claim 1, wherein said mixture has a non-Gaussian distribution of particles ESDs.

20. The coating composition according to claim 1, wherein said mixture has a bimodal distribution of particle ESDs, said bimodal distribution having a first peak at an ESD greater than 5 micrometers and a second peak at an ESD less than 5 micrometers.

21. The coating composition according to claim 1, wherein said median ESD of said particle population is in a range from about 2 to about 5 micrometers.

22. The coating composition according to claim 1, wherein said median ESD of said particle population is in a range from about 4 to about 5 micrometers.

23. The coating composition according to claim 1, wherein said first type of particles has a maximum ESD of about 20 micrometers; and said second type of particles has a maximum ESD of about 10 micrometers.

24. The coating composition according to claim 1, wherein said first type of particles has a maximum ESD of about 20 micrometers.

* * * * *